(12) United States Patent
Lai

(10) Patent No.: US 7,942,077 B2
(45) Date of Patent: May 17, 2011

(54) BICYCLE HANDLEBAR ASSEMBLY HAVING TIGHTLY CLAMPING EFFECT

(75) Inventor: Ching-Chuan Lai, Taichung (TW)

(73) Assignee: Bikeforce International Co., Ltd., Taichung (TW)

( * ) Notice: Subject to any disclaimer, the term of this patent is extended or adjusted under 35 U.S.C. 154(b) by 968 days.

(21) Appl. No.: 11/763,784

(22) Filed: Jun. 15, 2007

(65) Prior Publication Data

US 2008/0307923 A1 Dec. 18, 2008

(51) Int. Cl.
*B62K 21/26* (2006.01)
*B25G 1/10* (2006.01)

(52) U.S. Cl. .................... 74/551.9; 74/551.8; 16/421

(58) Field of Classification Search ............... 74/551.8, 74/551.9; 16/421
See application file for complete search history.

(56) References Cited

U.S. PATENT DOCUMENTS

| 4,852,423 | A  | * | 8/1989 | Mikami et al. | 74/551.9 |
| 6,112,618 | A  | * | 9/2000 | Yates | 74/551.9 |
| 6,263,759 | B1 | * | 7/2001 | Hollingsworth et al. | 74/551.9 |
| 6,923,089 | B2 | * | 8/2005 | Wu | 74/551.9 |
| 2003/0084747 | A1 | * | 5/2003 | Bendetti et al. | 74/551.9 |
| 2009/0031847 | A1 | * | 2/2009 | Grimes | 74/551.9 |
| 2009/0255093 | A1 | * | 10/2009 | Hsu | 16/421 |

* cited by examiner

*Primary Examiner* — Vinh T. Luong

(57) ABSTRACT

A handlebar assembly for a bicycle includes a handlebar tube, a sleeve, a clamping member and an end cap. Thus, the clamping plate of the end cap is clamped between any two of the clamping member, an end portion of the sleeve and an outer wall of the handlebar tube without obstructing the contact space between the clamping member and the outer wall of the handlebar tube so that the clamping member can directly clamp the handlebar tube completely or indirectly clamp the handlebar tube locally through the clamping plate of the end cap, thereby enhancing the clamping effect of the handlebar assembly.

1 Claim, 9 Drawing Sheets

BICYCLE HANDLEBAR ASSEMBLY HAVING TIGHTLY CLAMPING EFFECT

BACKGROUND OF THE INVENTION

1. Field of the Invention

The present invention relates to a handlebar assembly and, more particularly, to a handlebar assembly for a bicycle.

2. Description of the Related Art

A conventional handlebar assembly for a bicycle in accordance with the prior art shown in FIG. 17 comprises a handlebar tube (not shown), a plastic sleeve 1 mounted on an outer wall of the handlebar tube and having an end portion provided with two opposite protruding blocks 1a, a C-shaped metallic clamping member 2 mounted on the end portion of the sleeve 1 and having a first side formed with two opposite recesses 2a secured on the protruding blocks 1a of the sleeve 1 and a second side formed with an annular groove 2b, and an end cap 3 mounted on the clamping member 2 and having an inner side formed with an annular protrusion 3a inserted into the annular groove 2b of the clamping member 2 and an outer side formed with a pattern, logo or character.

However, the protruding blocks 1a of the sleeve 1 occupy the space of the inner wall of the clamping member 2, thereby decreasing the pressing force between the clamping member 2 and the handlebar tube. In addition, the annular protrusion 3a of the end cap 3 occupies the contact space between the clamping member 2 and the outer wall of the handlebar tube, thereby decreasing the clamping strength between the sleeve 1 and the handlebar tube. Further, the end cap 3 is rotatable relative to the clamping member 2 so that the pattern, logo or character formed on the outer side of the end cap 3 is easily deflected due to rotation of the end cap 3 relative to the clamping member 2, thereby decreasing the aesthetic quality of the handlebar assembly.

BRIEF SUMMARY OF THE INVENTION

In accordance with the present invention, there is provided a handlebar assembly, comprising a handlebar tube, a sleeve mounted on an outer wall of the handlebar tube, a clamping member mounted on an end portion of the sleeve, and an end cap including a cap body rested on the clamping member and at least one clamping plate protruded from the cap body and clamped between any two of the clamping member, the end portion of the sleeve and the outer wall of the handlebar tube.

The primary objective of the present invention is to provide a bicycle handlebar assembly having closely and tightly clamping effect.

Another objective of the present invention is to provide a handlebar assembly, wherein the clamping plate of the end cap is clamped between any two of the clamping member, the end portion of the sleeve and the outer wall of the handlebar tube without obstructing the frictional contact space between the clamping member and the outer wall of the handlebar tube so that the clamping member can directly clamp the handlebar tube completely or indirectly clamp the handlebar tube locally through the clamping plate of the end cap, thereby enhancing the clamping effect of the handlebar assembly.

A further objective of the present invention is to provide a handlebar assembly, wherein the width of the clamping member needs not to be increased, thereby decreasing the volume and weight of the handlebar assembly, and thereby decreasing the costs of fabrication.

A further objective of the present invention is to provide a handlebar assembly, wherein the end cap is not rotatable relative to the sleeve and the clamping member so that the pattern, logo or character formed on the second face of the cap body of the end cap is presented in a preset direction, thereby enhancing the aesthetic quality of the handlebar assembly.

A further objective of the present invention is to provide a handlebar assembly, wherein the clamping member is fully hidden in the enclosure of the end cap to enhance the aesthetic quality of the handlebar assembly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 2:
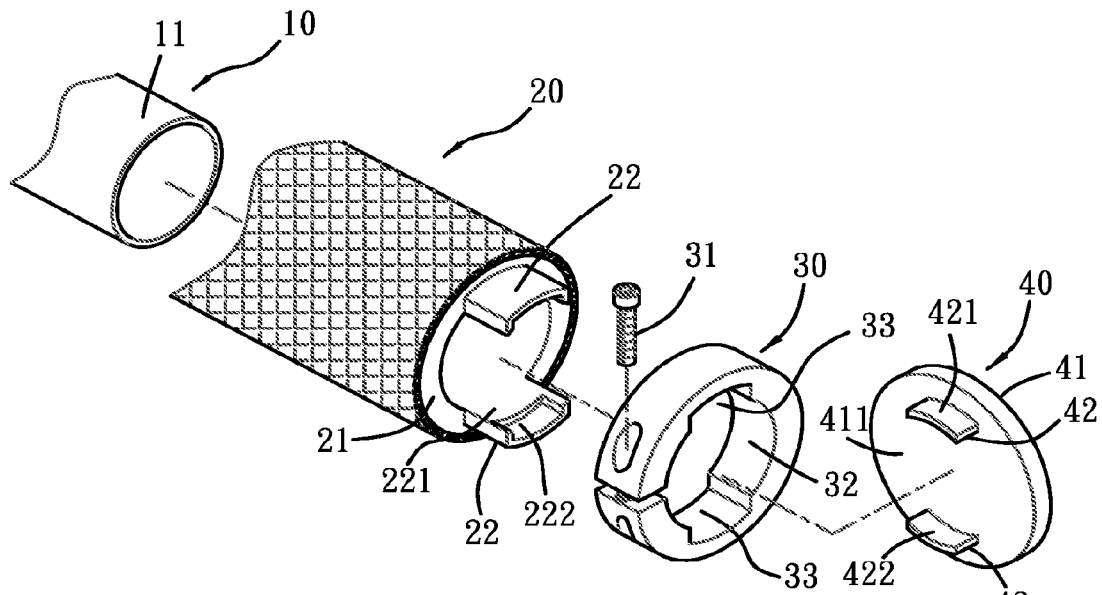
FIG. 2 is an exploded perspective view of the handlebar assembly as shown in FIG. 1.
Figure 1:
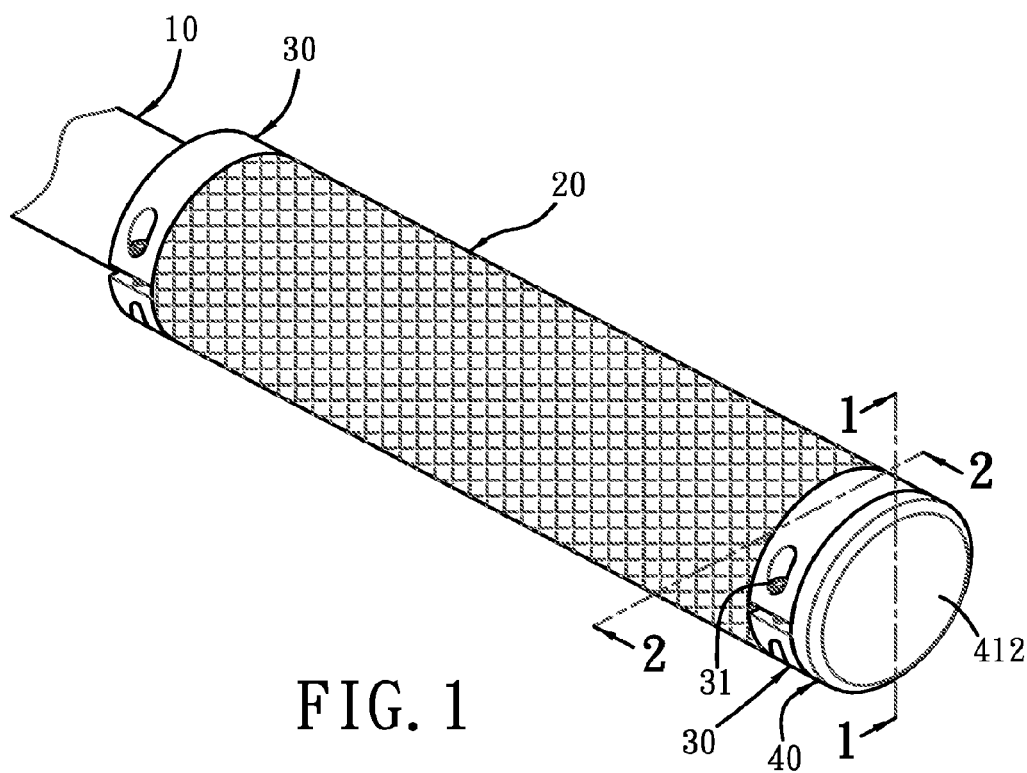
FIG. 1 is a perspective view of a handlebar assembly in accordance with the preferred embodiment of the present invention.
Figure 4:
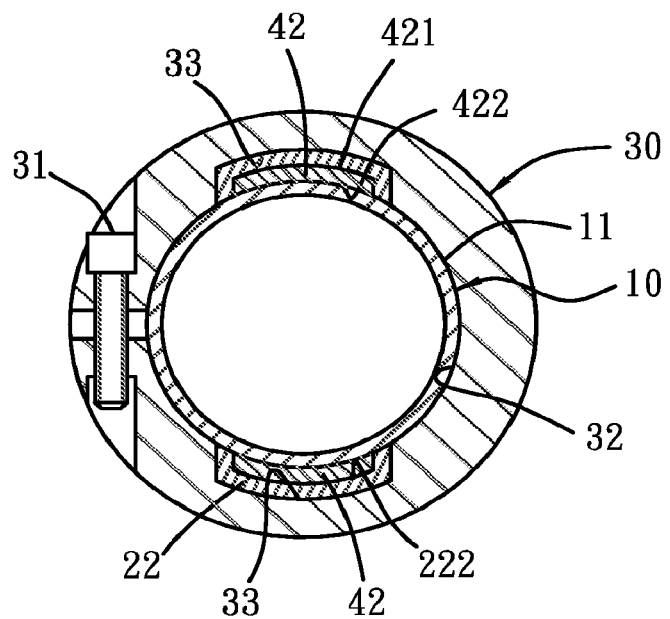
FIG. 4 is a side cross-sectional view taken along the line 2-2 of FIG. 1.
Figure 3:
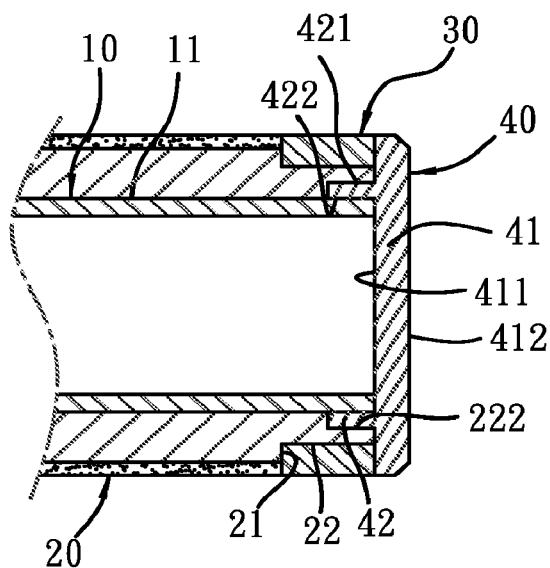
FIG. 3 is a front cross-sectional view taken along the line 1-1 of FIG. 1.

Referring to the drawings and initially to FIGS. 1-4, a handlebar assembly for a bicycle in accordance with the preferred embodiment of the present invention comprises a handlebar tube 10, a sleeve 20 mounted on an outer wall 11 of the handlebar tube 10, a clamping member 30 mounted on an end portion 21 of the sleeve 20, and an end cap 40 including a cap body 41 rested on the clamping member 30 and at least one clamping plate 42 protruded from the cap body 41 and clamped between any two of the clamping member 30, the end portion 21 of the sleeve 20 and the outer wall 11 of the handlebar tube 10.

The end portion 21 of the sleeve 20 is provided with at least one protruding block 22. The protruding block 22 of the sleeve 20 has a radial inner wall 221 formed with a substantially arc-shaped clamping slot 222.

The clamping member 30 is substantially C-shaped and has an inner wall 32 formed with at least one axially extending clamping recess 33 secured on the protruding block 22 of the sleeve 20. The clamping recess 33 of the clamping member 30 extends through a whole axial length of the clamping member 30. The clamping member 30 is tightened by a fastening bolt 31 to press the protruding block 22 of the sleeve 20 toward the handlebar tube 10 so that the clamping plate 42 of the end cap 40 is clamped between the protruding block 22 of the sleeve 20 and the outer wall 11 of the handlebar tube 10 closely and tightly to lock the end cap 40 onto the end portion 21 of the sleeve 20. Thus, the clamping plate 42 of the end cap 40 is limited by the protruding block 22 of the sleeve 20 so that the end cap 40 is not rotatable relative to the sleeve 20.

The cap body 41 of the end cap 40 has a first face 411 rested on the clamping member 30 and a second face 412 having a smooth profile. The clamping plate 42 of the end cap 40 protrudes from the first face 411 of the cap body 41. The clamping plate 42 of the end cap 40 is substantially arc-shaped. The clamping plate 42 of the end cap 40 is inserted into and secured in the clamping slot 222 of the protruding block 22 of the sleeve 20. The clamping plate 42 of the end cap 40 has an outer clamped face 421 rested on a bottom wall of the clamping slot 222 of the protruding block 22 of the sleeve 20 and an inner clamped face 422 rested on the outer wall 11 of the handlebar tube 10 so that the clamping plate 42 of the end cap 40 is clamped between the protruding block 22 of the sleeve 20 and the outer wall 11 of the handlebar tube 10.

In the preferred embodiment of the present invention, the end cap 40 includes two opposite clamping plates 42, the end portion 21 of the sleeve 20 is provided with two opposite protruding blocks 22 and the clamping member 30 is formed with two opposite clamping recesses 33.

Figure 6:
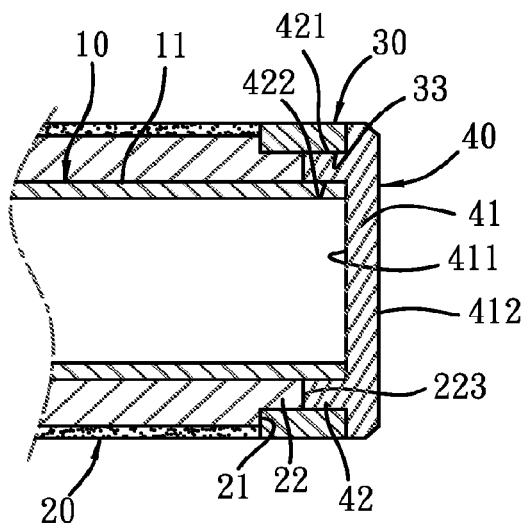
FIG. 6 is a front cross-sectional view taken along the line 3-3 of FIG. 5.
Figure 5:
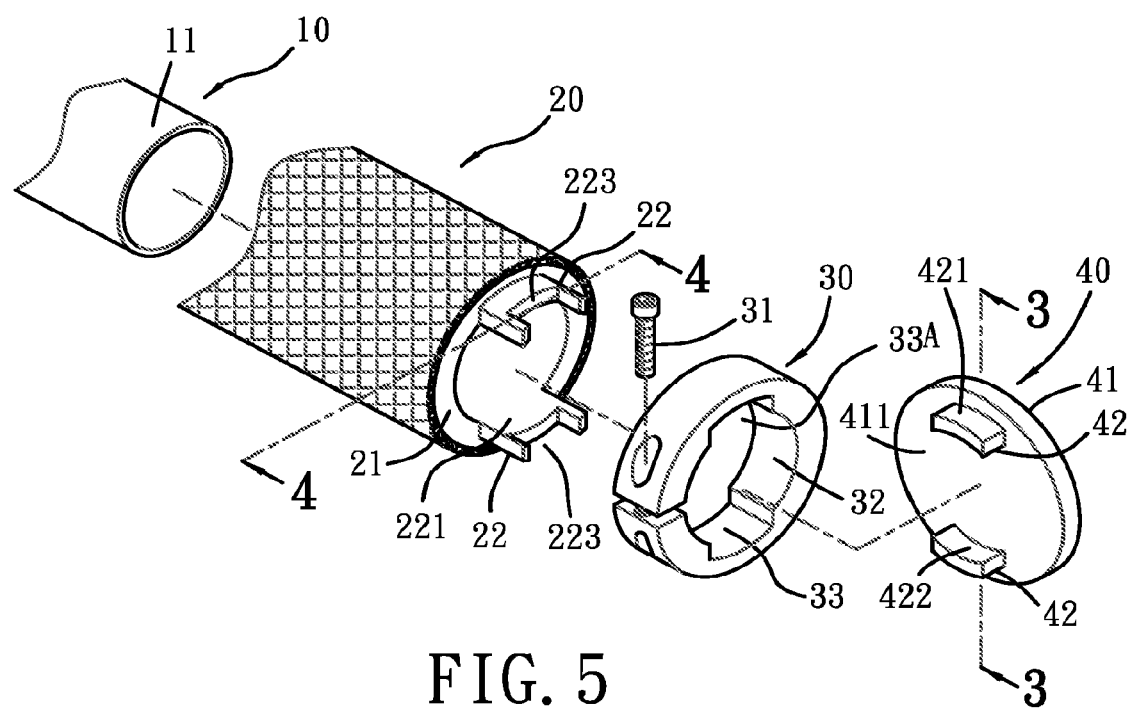
FIG. 5 is an exploded perspective view of a handlebar assembly in accordance with another preferred embodiment of the present invention.
Figure 7:
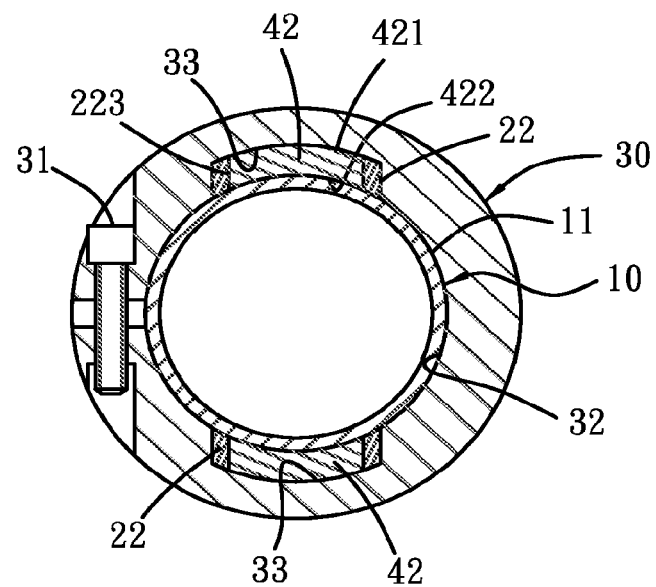
FIG. 7 is a side cross-sectional view taken along the line 4-4 of FIG. 5.

Referring to FIGS. 5-7, the clamping slot 223 of the protruding block 22 of the sleeve 20 extends through a whole thickness of the protruding block 22 of the sleeve 20. The clamping plate 42 of the end cap 40 has a thickness equal to that of the clamping slot 223 of the protruding block 22 of the sleeve 20 and has an outer clamped face 421 rested on a bottom wall of the clamping recess 33 of the clamping member 30 and an inner clamped face 422 rested on the outer wall 1 of the handlebar tube 10 so that the clamping plate 42 of the end cap 40 is clamped between the clamping member 30 and the outer wall 11 of the handlebar tube 10.

Figure 8:
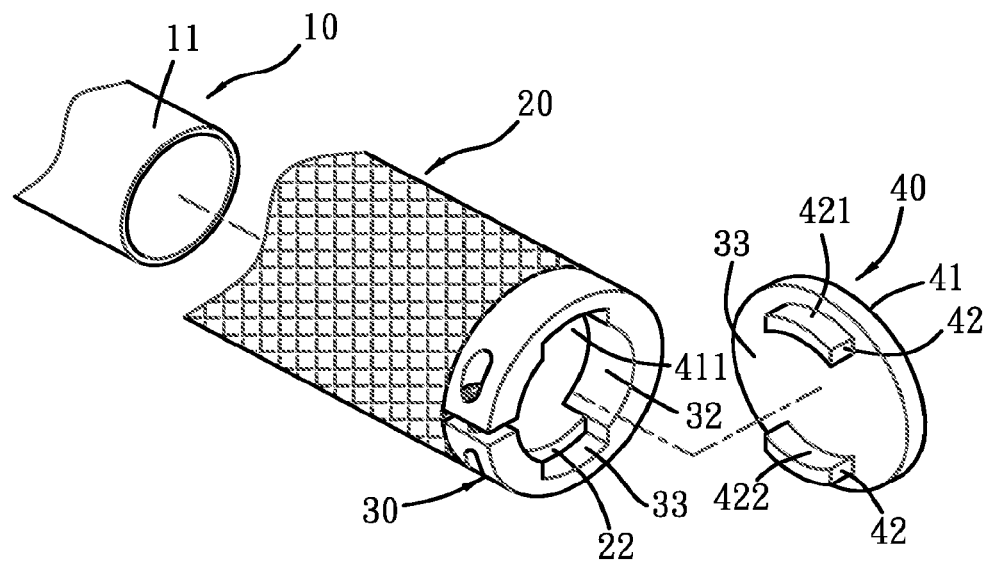
FIG. 8 is a partially exploded perspective view of a handlebar assembly in accordance with another preferred embodiment of the present invention.
Figure 9:
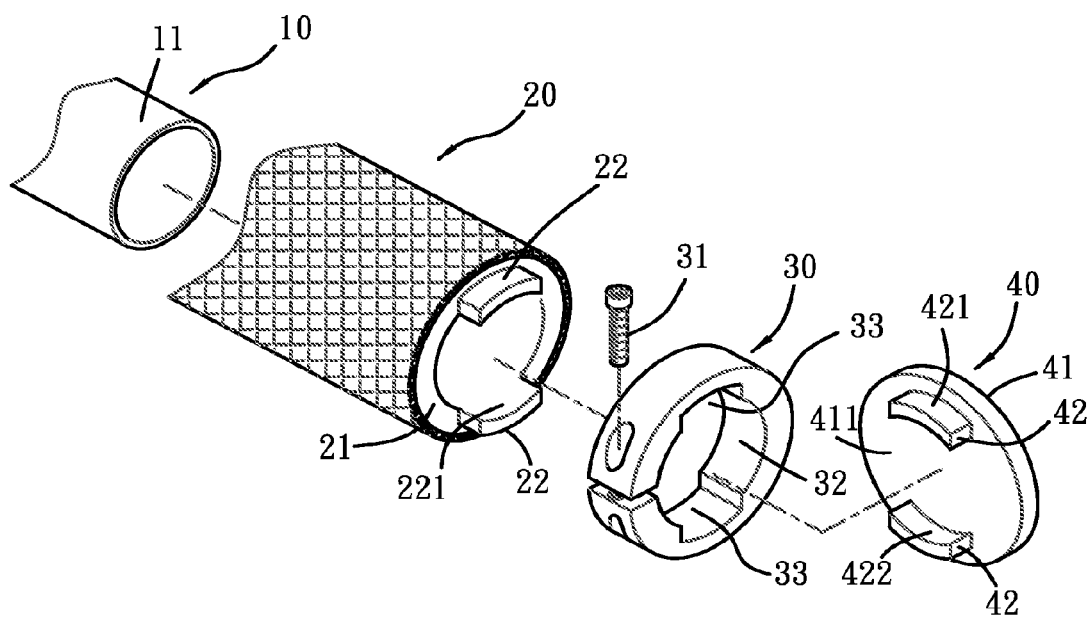
FIG. 9 is an exploded perspective view of the handlebar assembly as shown in FIG. 8.

Referring to FIGS. 8 and 9, the clamping plate 42 of the end cap 40 is inserted into and secured in the clamping recess 33 of the clamping member 30 and juxtaposed to the protruding block 22 of the sleeve 20. The clamping plate 42 of the end cap 40 has an outer clamped face 421 rested on a bottom wall of the clamping recess 33 of the clamping member 30 and an inner clamped face 422 rested on the outer wall 1 of the handlebar tube 10 so that the clamping plate 42 of the end cap 40 is clamped between the clamping member 30 and the outer wall 11 of the handlebar tube 10.

Figure 10:
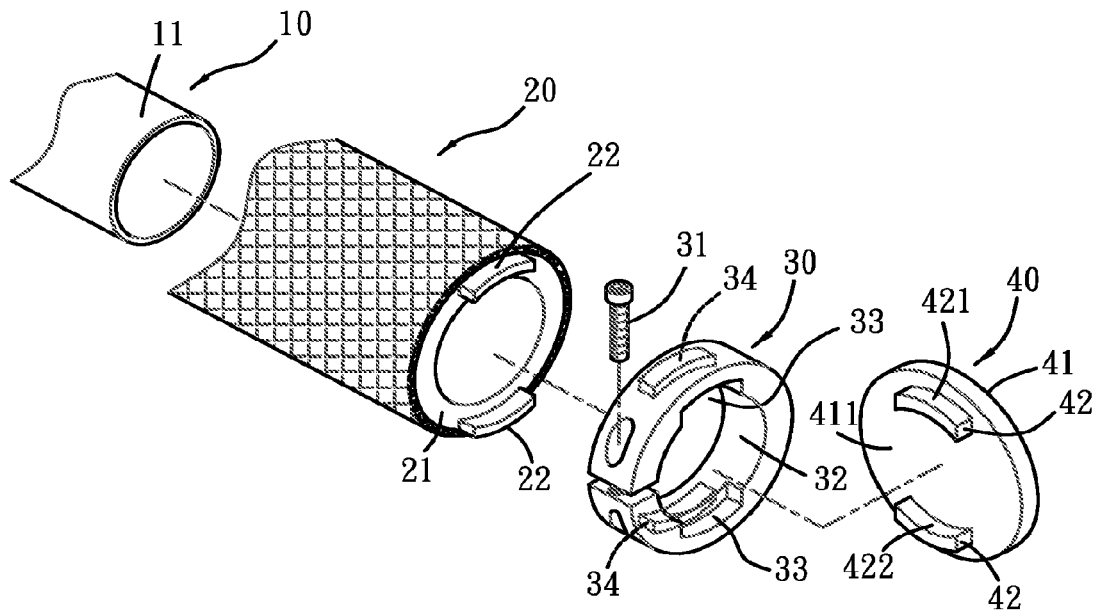
FIG. 10 is an exploded perspective view of a handlebar assembly in accordance with another preferred embodiment of the present invention.
Figure 12:
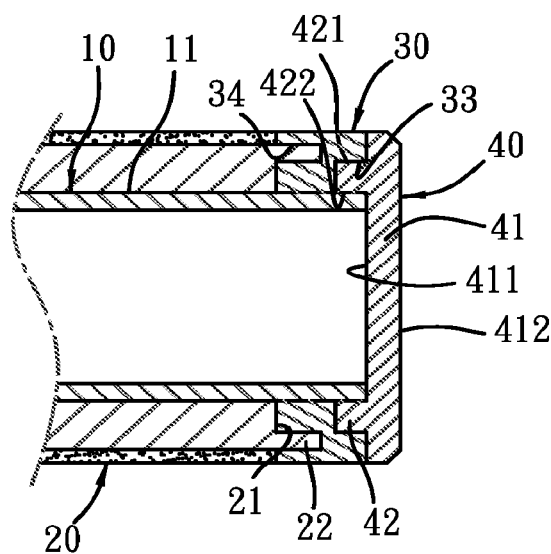
FIG. 12 is a front cross-sectional assembly view of the handlebar assembly as shown in FIG. 10.
Figure 11:
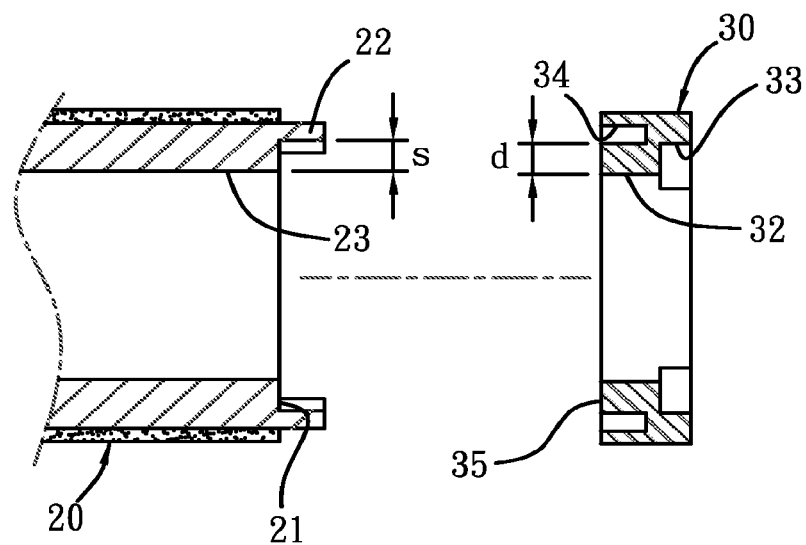
FIG. 11 is a front cross-sectional view of the handlebar assembly as shown in FIG. 10.

Referring to FIGS. 10-12, the clamping member 30 has an inner wall 32 having a first side 35 formed with at least one axially extending clamping groove 34 secured on the protruding block 22 of the sleeve 20 and a second side formed with at least one axially extending clamping recess 33. The clamping plate 42 of the end cap 40 is inserted into and secured in the clamping recess 33 of the clamping member 30. The clamping plate 42 of the end cap 40 has an outer clamped face 421 rested on a bottom wall of the clamping recess 33 of the clamping member 30 and an inner clamped face 422 rested on the outer wall 11 of the handlebar tube 10 so that the clamping plate 42 of the end cap 40 is clamped between the clamping member 30 and the outer wall 11 of the handlebar tube 10. The protruding block 22 of the sleeve 20 and an inner wall 23 of the sleeve 20 are spaced from a first radial distance "s", and the clamping groove 34 of the clamping member 30 and the inner wall 32 of the clamping member 30 are spaced from a second radial distance "d" which is equal to the first radial distance "s".

Figure 13:
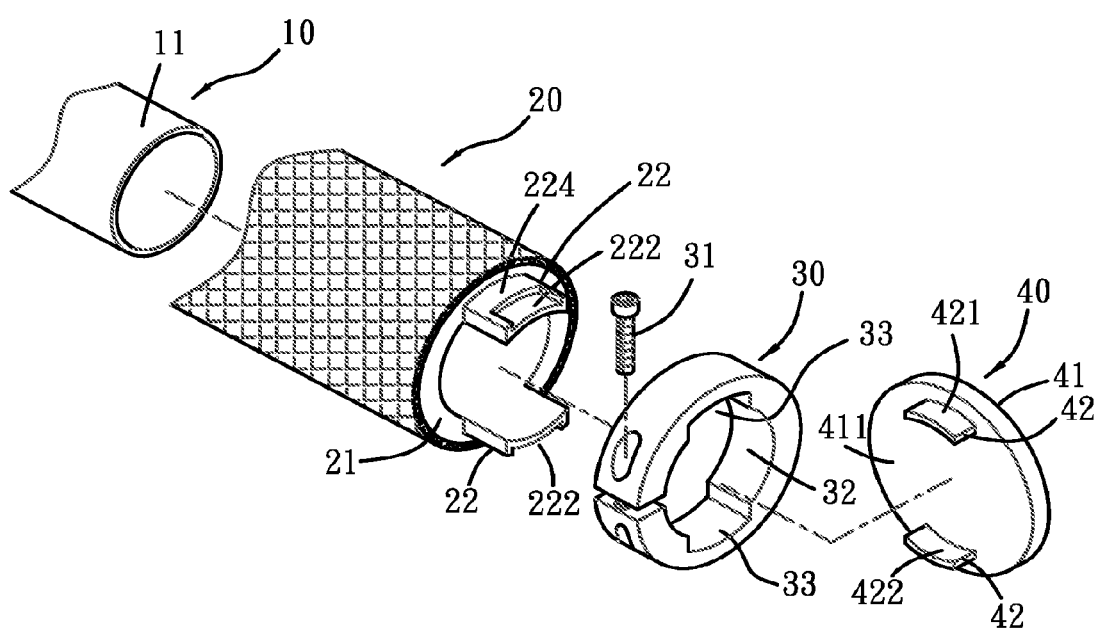
FIG. 13 is an exploded perspective view of a handlebar assembly in accordance with another preferred embodiment of the present invention.

Referring to FIG. 13, the protruding block 22 of the sleeve 20 has a radial outer wall 224 formed with a substantially arc-shaped clamping slot 222. The clamping plate 42 of the end cap 40 is inserted into and secured in the clamping slot 222 of the protruding block 22 of the sleeve 20. The clamping plate 42 of the end cap 40 has an outer clamped face 421 rested on a bottom wall of the clamping recess 33 of the clamping member 30 and an inner clamped face 422 rested on a bottom wall of the clamping slot 222 of the protruding block 22 of the sleeve 20 so that the clamping plate 42 of the end cap 40 is clamped between the protruding block 22 of the sleeve 20 and the clamping member 30.

Figure 14:
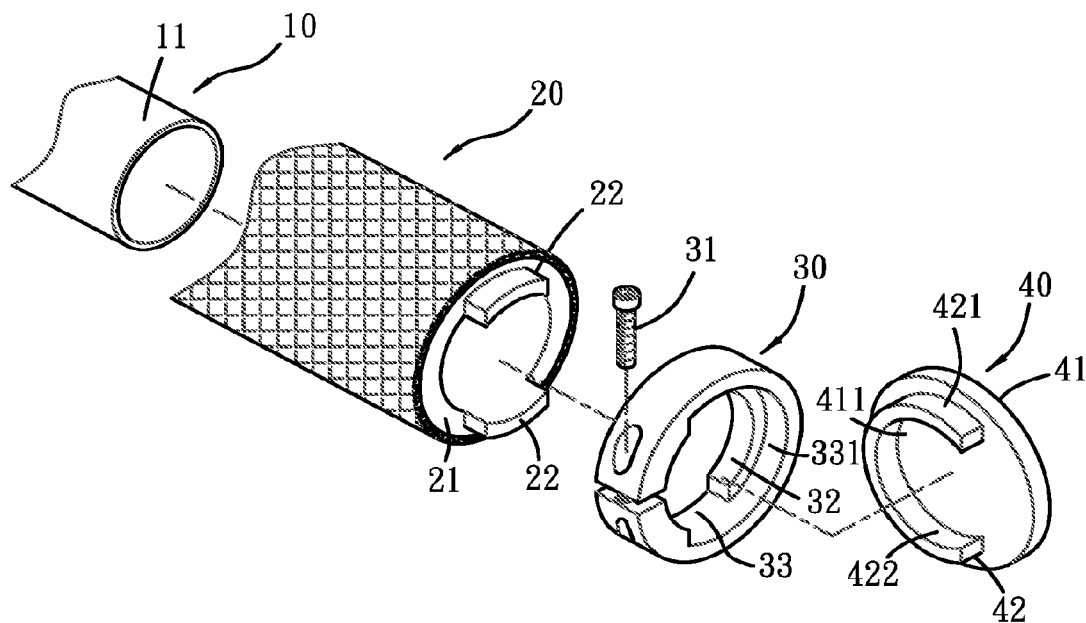
FIG. 14 is an exploded perspective view of a handlebar assembly in accordance with another preferred embodiment of the present invention.

Referring to FIG. 14, the clamping member 30 has an inner wall 32 having a first side formed with at least one axially extending clamping recess 33 secured on the protruding block 22 of the sleeve 20 and a second side formed with an axially extending clamping channel 331 which is substantially C-shaped. The clamping plate 42 of the end cap 40 is substantially C-shaped and inserted into and secured in the clamping channel 331 of the clamping member 30. The clamping plate 42 of the end cap 40 has an outer clamped face 421 rested on a bottom wall of the clamping channel 331 of the clamping member 30 and an inner clamped face 422 rested on the outer wall 11 of the handlebar tube 10 so that the clamping plate 42 of the end cap 40 is clamped between the clamping member 30 and the outer wall 11 of the handlebar tube 10.

Figure 15:
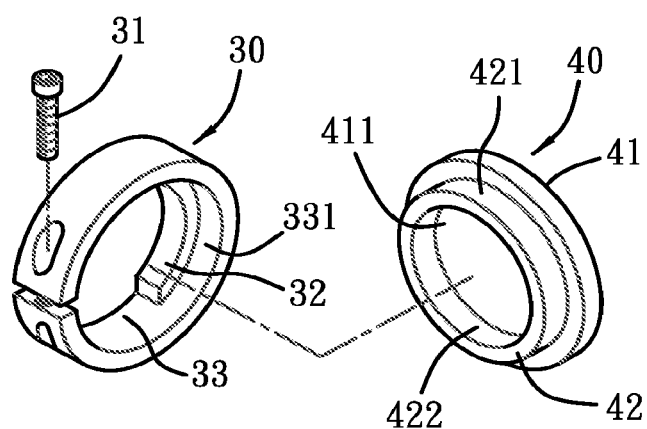
FIG. 15 is a partially exploded perspective view of a handlebar assembly in accordance with another preferred embodiment of the present invention.
Figure 17:
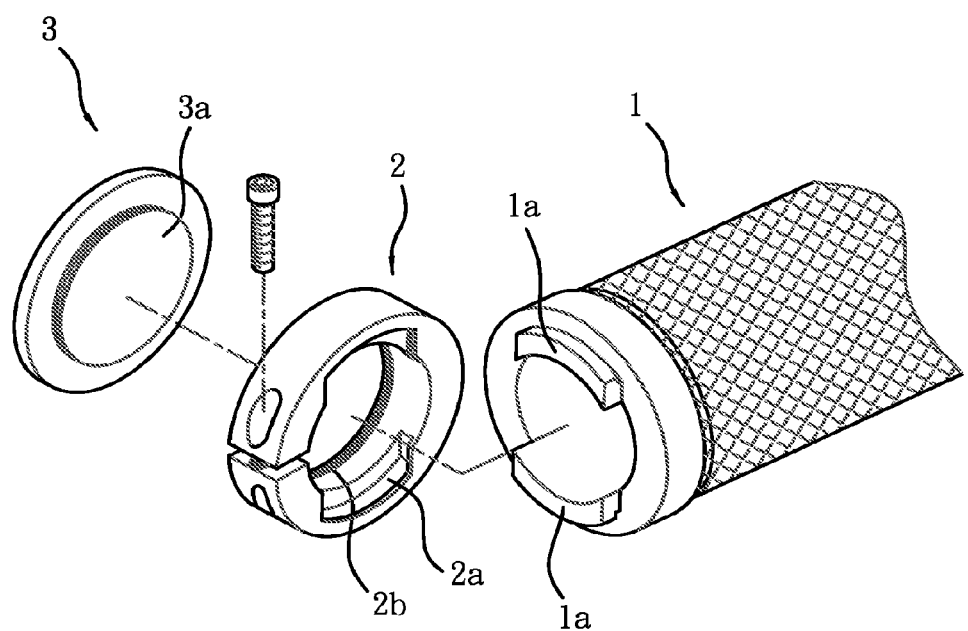
FIG. 17 is an exploded perspective view of a conventional handlebar assembly in accordance with the prior art.

Referring to FIG. 15, the clamping channel 331 of the clamping member 30 has an annular shape, and the clamping plate 42 of the end cap 40 has an annular shape.

Figure 16:
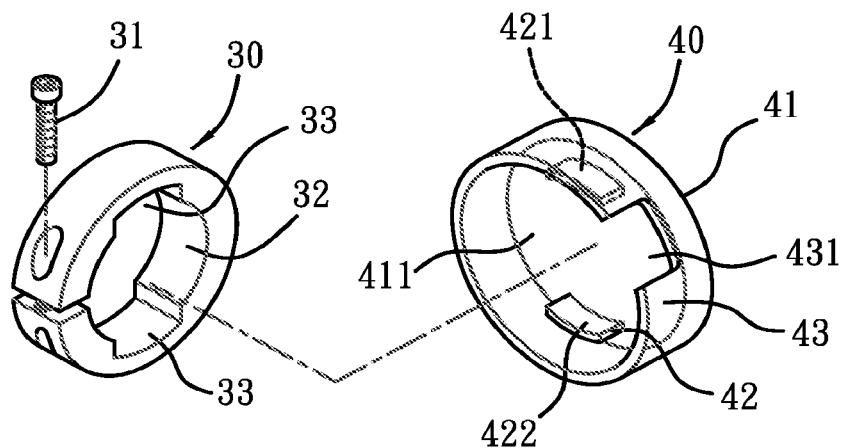
FIG. 16 is a partially exploded perspective view of a handlebar assembly in accordance with another preferred embodiment of the present invention.

Referring to FIG. 16, the end cap 40 further includes an annular enclosure 43 protruded from the cap body 41 and enclosed around the clamping member 30 so that the clamping member 30 is fully hidden in the enclosure 43 of the end cap 40 to enhance the aesthetic quality of the handlebar assembly. The enclosure 43 of the end cap 40 has a side formed with an opening 431 aligning with the fastening bolt 31 to expose the fastening bolt 31 outwardly from the end cap 40 to facilitate a user operating the fastening bolt 31.

Accordingly, the clamping plate 42 of the end cap 40 is clamped between any two of the clamping member 30, the end portion 21 of the sleeve 20 and the outer wall 11 of the handlebar tube 10 without obstructing the frictional contact space between the clamping member 30 and the outer wall 11 of the handlebar tube 10 so that the clamping member 30 can directly clamp the handlebar tube 10 completely or indirectly clamp the handlebar tube 10 locally through the clamping plate 42 of the end cap 40, thereby enhancing the clamping effect of the handlebar assembly. In addition, the width of the clamping member 30 needs not to be increased, thereby decreasing the volume and weight of the handlebar assembly, and thereby decreasing the costs of fabrication. Further, the end cap 40 is not rotatable relative to the sleeve 20 and the clamping member 30 so that the pattern, logo or character formed on the second face 412 of the cap body 41 of the end cap 40 is presented in a preset direction, thereby enhancing the aesthetic quality of the handlebar assembly. Further, the clamping member 30 is fully hidden in the enclosure 43 of the end cap 40 to enhance the aesthetic quality of the handlebar assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A handlebar assembly, comprising:
   a handlebar tube;
   a sleeve mounted on an outer wall of the handlebar tube;
   a plurality of clamping members mounted on an end portion of the sleeve;
   an end cap including a cap body rested on the clamping member and at least one clamping plate protruded from the cap body and clamped between any two of the clamping members, the end portion of the sleeve and the outer wall of the handlebar tube;
   wherein the end portion of the sleeve is provided with at least one protruding block;
   wherein the clamping member has an inner wall formed with at least one axially extending clamping recess secured on the protruding block of the sleeve; the protruding block of the sleeve has a radial inner wall proximate to the end portion of the sleeve and a clamping slot formed between the radial inner wall and an end portion of the protruding block; the clamping plate of the end cap is inserted into and secured in the clamping slot of the protruding block of the sleeve;
   wherein the clamping plate of the end cap has an outer clamped face rested on a bottom wall of the clamping slot of the protruding block of the sleeve and an inner clamped face rested on the outer wall of the handlebar tube so that the clamping plate of the end cap is clamped between the protruding block of the sleeve and the outer wall of the handlebar tube.

* * * * *